(12) United States Patent
Ananthakrishnan et al.

(10) Patent No.: US 10,970,591 B2
(45) Date of Patent: Apr. 6, 2021

(54) AUTOMATED ACCURATE VIABLE SOLAR AREA DETERMINATION

(71) Applicant: OnSwitch LLC, San Francisco, CA (US)

(72) Inventors: Vijay Anand Ananthakrishnan, Richmond, CA (US); Stacia Renee Okura, Santa Rosa, CA (US); Mark Andrew Bronez, San Francisco, CA (US)

(73) Assignee: OnSwitch LLC, San Francisco, CA (US)

(*) Notice: Subject to any disclaimer, the term of this patent is extended or adjusted under 35 U.S.C. 154(b) by 0 days.

(21) Appl. No.: 16/442,280

(22) Filed: Jun. 14, 2019

(65) Prior Publication Data
US 2019/0303707 A1 Oct. 3, 2019

Related U.S. Application Data

(63) Continuation of application No. 15/246,360, filed on Aug. 24, 2016, now Pat. No. 10,373,011.
(Continued)

(51) Int. Cl.
G06K 9/00 (2006.01)
G06K 9/46 (2006.01)
G01C 21/36 (2006.01)
G06F 30/13 (2020.01)
G06T 3/40 (2006.01)
G06T 11/20 (2006.01)
(Continued)

(52) U.S. Cl.
CPC ........ *G06K 9/4661* (2013.01); *G01C 21/3617* (2013.01); *G06F 30/13* (2020.01); *G06K 9/00637* (2013.01); *G06K 9/00657* (2013.01); *G06K 9/4604* (2013.01); *G06T 3/4038* (2013.01); *G06T 11/206* (2013.01); *G01C 11/06* (2013.01); *G06F 2111/04* (2020.01)

(58) Field of Classification Search
CPC ................................................. G06K 9/4661
See application file for complete search history.

(56) References Cited

U.S. PATENT DOCUMENTS 8,594,375 B1 11/2013 Padwick
10,140,401 B1* 11/2018 Hoff ........................ G06F 30/20
(Continued)

FOREIGN PATENT DOCUMENTS

WO 2007127864 6/2008

OTHER PUBLICATIONS

Agugiaro et al. "Solar radiation estimation on building roofs and web-based solar cadastre." ISPRS Ann. Photogramm. Remote Sens. Spat. Inf. Sci 1 (2012): 177-182.
(Continued)

*Primary Examiner* — Oneal R Mistry
(74) *Attorney, Agent, or Firm* — Van Pelt, Yi & James LLP

(57) ABSTRACT

A system for determining a viable area automatically and accurately includes an interface and a processor. The interface is configured to receive location information. The processor is configured to determine imagery data based on the location information, to determine a point cloud using the imagery data, determine one or more features using the point cloud, determine viable area using the one or more features, and determine a solar irradiance of the viable area.

14 Claims, 12 Drawing Sheets

Related U.S. Application Data

(60) Provisional application No. 62/210,339, filed on Aug. 26, 2015.

(51) Int. Cl.
*G01C 11/06* (2006.01)
*G06F 111/04* (2020.01)

(56) References Cited

U.S. PATENT DOCUMENTS

| | | |
|---|---|---|
| 2009/0177458 A1 | 7/2009 | Hochart |
| 2009/0304227 A1 | 12/2009 | Kennedy |
| 2011/0295575 A1 | 12/2011 | Levine |
| 2012/0035887 A1 | 2/2012 | Augenbraun |
| 2012/0044476 A1 | 2/2012 | Earhart |
| 2012/0155704 A1* | 6/2012 | Williams ............... G01W 1/00 382/103 |
| 2014/0176543 A1 | 6/2014 | MacDonald |
| 2014/0253543 A1* | 9/2014 | Raif ....................... G06T 17/00 345/419 |
| 2014/0320607 A1* | 10/2014 | Hamann ............ H04N 5/23296 348/47 |
| 2015/0161442 A1 | 6/2015 | Sadka |
| 2016/0306824 A1* | 10/2016 | Lopez .................. G06T 3/4092 |
| 2016/0363696 A1 | 12/2016 | Dao |
| 2017/0053043 A1* | 2/2017 | LaRue .................. H02S 20/23 |
| 2018/0136366 A1 | 5/2018 | Vega-Avila |

OTHER PUBLICATIONS

Caroline Carl. Calculating solar photovoltaic potential on residential rooftops in Kailua Kona, Hawaii. Diss. University of Southern California, 2014.

Iqbal., et al. "Optimization classification, algorithms and tools for renewable energy: A review." renewable and sustainable energy reviews 39 (2014): 640-654.

Martin et al. "Applying LIDAR datasets and GIS based model to evaluate solar potential over roofs: a review." AIMS Energy 3.3 (2015): 326-343.

* cited by examiner

US 10,970,591 B2

AUTOMATED ACCURATE VIABLE SOLAR AREA DETERMINATION

CROSS REFERENCE TO OTHER APPLICATIONS

This application is a continuation of co-pending U.S. patent application Ser. No. 15/246,360, entitled AUTOMATED ACCURATE VIABLE SOLAR AREA DETERMINATION filed Aug. 24, 2016 which is incorporated herein by reference for all purposes, which claims priority to U.S. Provisional Patent Application No. 62/210,339 entitled AUTOMATED REMOTE IDENTIFICATION AND EXTRACTION OF PHYSICAL TERRAIN AND STRUCTURE FEATURES filed Aug. 26, 2015 which is incorporated herein by reference for all purposes.

BACKGROUND OF THE INVENTION

Currently, the solution for determination of an active or viable solar production area for a solar installation is slow and labor intensive. Because of this constraint, the design process for solar installations suffers in accuracy (e.g., in order to get to a finalized design, sometimes steps are done in a less thorough manner in the pursuit of speed) and refinement (e.g., in order to get to a finalized design, iterations are not performed), and the delays negatively impact a user's ability to optimize solar installations.

BRIEF DESCRIPTION OF THE DRAWINGS

Various embodiments of the invention are disclosed in the following detailed description and the accompanying drawings.

DETAILED DESCRIPTION

Figure 1:
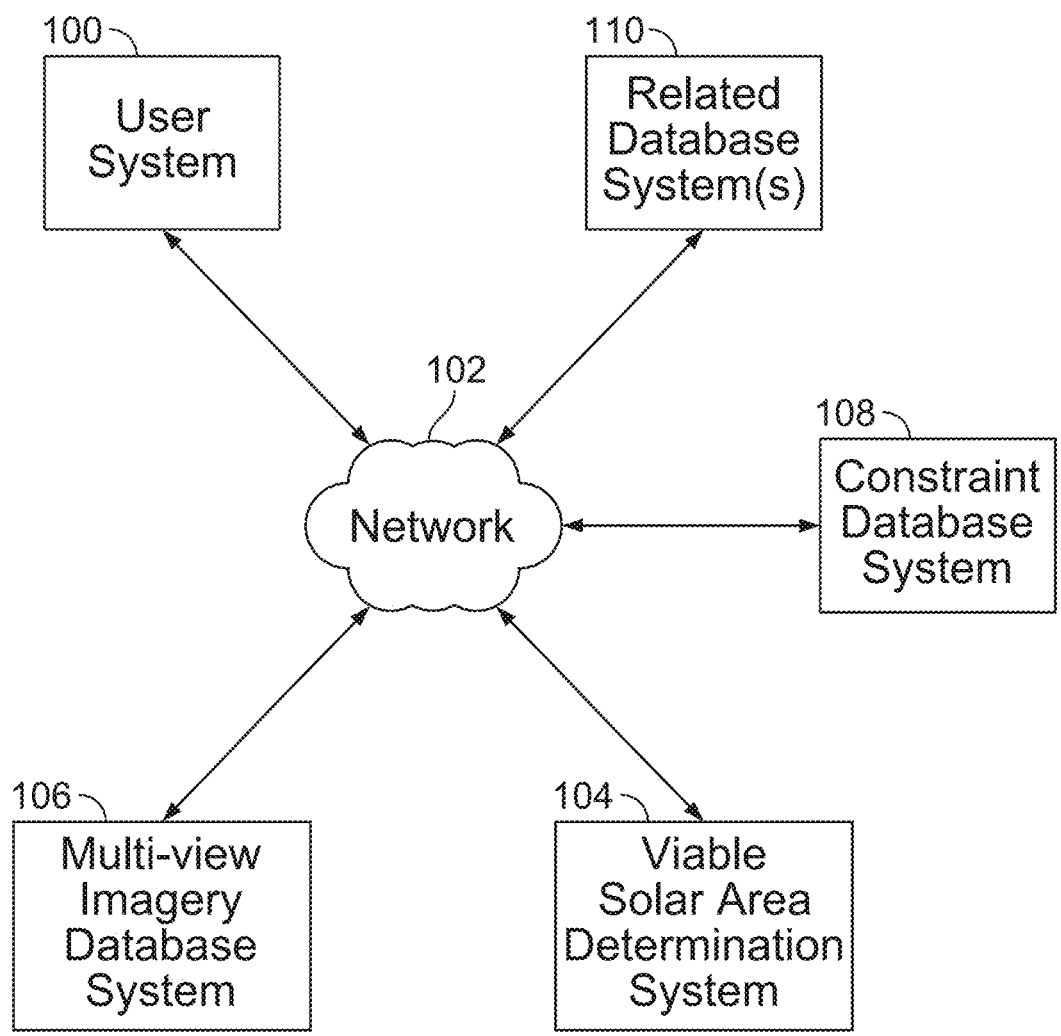
FIG. 1 is a diagram illustrating an embodiment of a system for determining an active solar area.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining a viable area automatically and accurately is disclosed. The system includes an interface and a processor. The interface is configured to receive location information. The processor is configured to determine multi-view imagery data based on the location information, to determine a point cloud using the multi-view imagery data, determine one or more features using the point cloud, determine a viable area using the one or more features, and determine a solar irradiance of the viable area.

In some embodiments, the point cloud comprises a set of three dimensionally specified points representing an uppermost surface of ground, vegetation, structure, and/or items at a location as reconstructed from multi-view imagery data. In various embodiments, multi-view imagery is generated using any of the following technologies, including but not limited to a light imaging, detection, and ranging (LIDAR) system, an aerial survey photogrammetry system, a satellite interferometry system, a global positioning system (GPS), or any other appropriate imaging system.

In some embodiments, the system for determining an active or viable area comprises a system for automatically and rapidly determining a viable solar area associated with a location and the solar incidence for the viable area. The solar incidence and a set of constraints are then used to determine a solar installation design. The user is able to adjust constraints or modify the site (e.g., trim vegetation, change available area, change design goal criteria, etc.) and rapidly and automatically recalculate the viable or active solar area, the solar incidence or irradiance, and the solar installation design. In some embodiments, the system includes automated feature extraction and identification technology. The automated feature extraction and identification technology are used to instantaneously, accurately and optimally design and calculate pricing for solar array systems to the specifics of any site and user preferences (e.g., maximizing long term cost savings, minimizing payback period, excluding specific areas of the site from the analysis, adding in cost of new roof, adding energy storage system, removing tax benefits, etc.) while avoiding site obstructions and site areas where obstructions shade the panels to an unacceptable degree throughout the course of a year. The automated feature extraction and identification technology takes specific, highly accurate, three-dimensional data of terrain, vegetation, and structures ("geospatial data"); applies innovative techniques to automatically and accurately extract characteristics and all dimensions of the features; and can automatically assign features to individual land parcels using geographic metadata (e.g., where the metadata comprises digital information assigned to an extracted data point—for example, X,Y,Z coordinates, pixel size, ground resolution, infrared data, etc.), and can enable solar panel layout software to be automated and optimized.

In some embodiments, the data that are mined from the geospatial data using the automated feature extraction and identification technology opens the door to a new way of designing solar electricity systems and vastly improves the current state of solar design and customers' experience evaluating the purchase of solar electricity systems. The automated feature extraction and identification technology enables instant creation of accurate solar electricity system designs and a simple end-to-end online customer experience for evaluating or purchasing a solar system.

In some embodiments, the automated feature extraction and identification technology also enables system designs to be instantly optimized for customer-defined preferences, allowing for optimized economic analyses and energy analyses, and an accurate online interface with accurate cost assessment for the solar system—all with as little as one input online from the customer: the address of their geographic site, which could be input as a postal address, input as latitude and longitude, selected graphically from a user input screen, input as part of a batch file of multiple addresses of interest, etc.

In some embodiments, the automated feature extraction technology is applicable to:
  a variety of solar technologies including photovoltaics (PV), solar thermal, and utility parabolic;
  a variety of solar mounting and placement methods for diverse sites including rooftops, other man-made structures, parking lots, and ground;
  a variety of solar customer markets, including residential, commercial, and utility markets, as well as on-grid and off-grid versions; and
  a variety of non-solar markets and industries, including roofing, construction, water, power, forestry, government, and insurance.

In some embodiments, the automated feature extraction and identification technology relies on highly accurate geospatial data and extracts and identifies features from the geospatial data. Specifically, the system uses high-resolution geospatial data to extract obstructions and to automatically define the mounting planes for solar panels while avoiding obstructions and their annual shading, whereby obstructions can include man-made structures, nearby vegetation, or distant elevated terrain. The system determines an accurate positional relationship between the mounting planes and the obstructions in an automated way.

In some embodiments, the system's automated feature extraction and identification technology includes the following steps:
  2D raw digital imagery data acquisition;
  3D photographic reconstruction;
  3D point cloud generation;
  features extraction with associated x,y,z coordinates from the 3D point cloud; and
  feature assignment to individual parcels/sites including their relative positions in 3D space.

In some embodiments, for a given physical site, the system uses the extracted features as input to its line-of-site shading/solar irradiance analysis and lays out solar panels on mounting planes based on solar irradiance levels that strike each point on a mounting plane during the course of a year and design criteria (e.g., maximizing power production, minimizing installation cost, minimizing area used, matching current power usage, maximizing return, targeting a specific cost, targeting production to a percentage of current power usage, etc.).

In various embodiments, two dimensional multi-view imagery and/or point cloud data are determined based at least in part on location information and retrieved from one or more databases.

In some embodiments, diverse mathematical approaches are used to optimize the solar system design. The system is further configured for consumer-defined preferences, with as little as one input online from the consumer—their address. The data utilized and produced by the system include:
  high resolution geospatial rendering of the site, including a geolocation (x,y,z) and material characteristics (e.g., roof material type, tree species, asphalt parking lot, etc.) of every point;
  solar irradiance taking all sizes of obstructions on the site, near the site, and far from the site into account;
  design constraints (e.g., permitting agency requirements for setback distance from roof edges or width and number of fireman access rows between solar arrays);
  solar system components (e.g., inverters, modules, racking, etc.);
  solar energy production and site electricity consumption analyses;
  production, costs, and savings for different solar system design options; and
  economic analyses (e.g., pricing, financing alternatives, government financial incentives, tax impacts, etc. and the impact on customer's total savings, payback, net present value (NPV), etc.).

FIG. 1 is a diagram illustrating an embodiment of a system for determining a viable solar area. In the example shown, user system 100, multi-view imagery database system 106, constraint database system 108, related database system(s) 110, and viable solar area determination system 104 are able to communicate with each other using network 102. A user using user system 100 provides an input location (e.g., a residence, a commercial site, etc.) and any preferences that impact the determination of active or viable solar area or subsequent solar system design and quotation. User system 100 provides viable solar area determination system 104 the input location. Viable solar area determination system 104 uses the location to determine appropriate data to retrieve from multi-view imagery database 106. Viable solar area determination system 104 determines a point cloud by analyzing the data from multi-view imagery database 106 (e.g., using overlapping aerial photos to determine 3-dimensional coordinates associated with objects located at the input location. After determining the point cloud, the points of the point cloud are classified (e.g., as a structure, as ground, as vegetation, as distant terrain, etc.). Points classified as structure are then grouped as being associated with planes in the event that they neighbor each other and have the same orientation. Points assigned to other classifications are grouped by such criteria as: material composition, geometric proximity, and similarity to stored generic object primitives that could include trees, bushes, vent pipes, rooftop heating and air conditioning equipment, parking lot layouts, etc. The solar incidence is then determined for each area (e.g., each 1 foot square tile) of the plane as calculated over a day and over the year. The solar incidence accounts for the obstructions (e.g., other structures, vegetation, roof obstructions, hills, etc.). A solar installation is then determined based on constraints that are retrieved from constraint database system 108 or input by a user. A user can update constraints or vegetation trimmings or select a different optimization goal which automatically updates the outputs of the system (e.g., viable solar areas, layout for the solar installation, etc.). In various embodiments, a tree trimming is specified as changing the height (e.g., chopping off vegetation above a height (topping), changing the radius of a tree, removing the tree, or any other appropriate trimming. Related databases 110 include databases with related solar irradiation data, point cloud data, position data, viable solar area data, energy potential of viable area data, or any other appropriate data useful for active or viable solar area determination.

Figure 2:
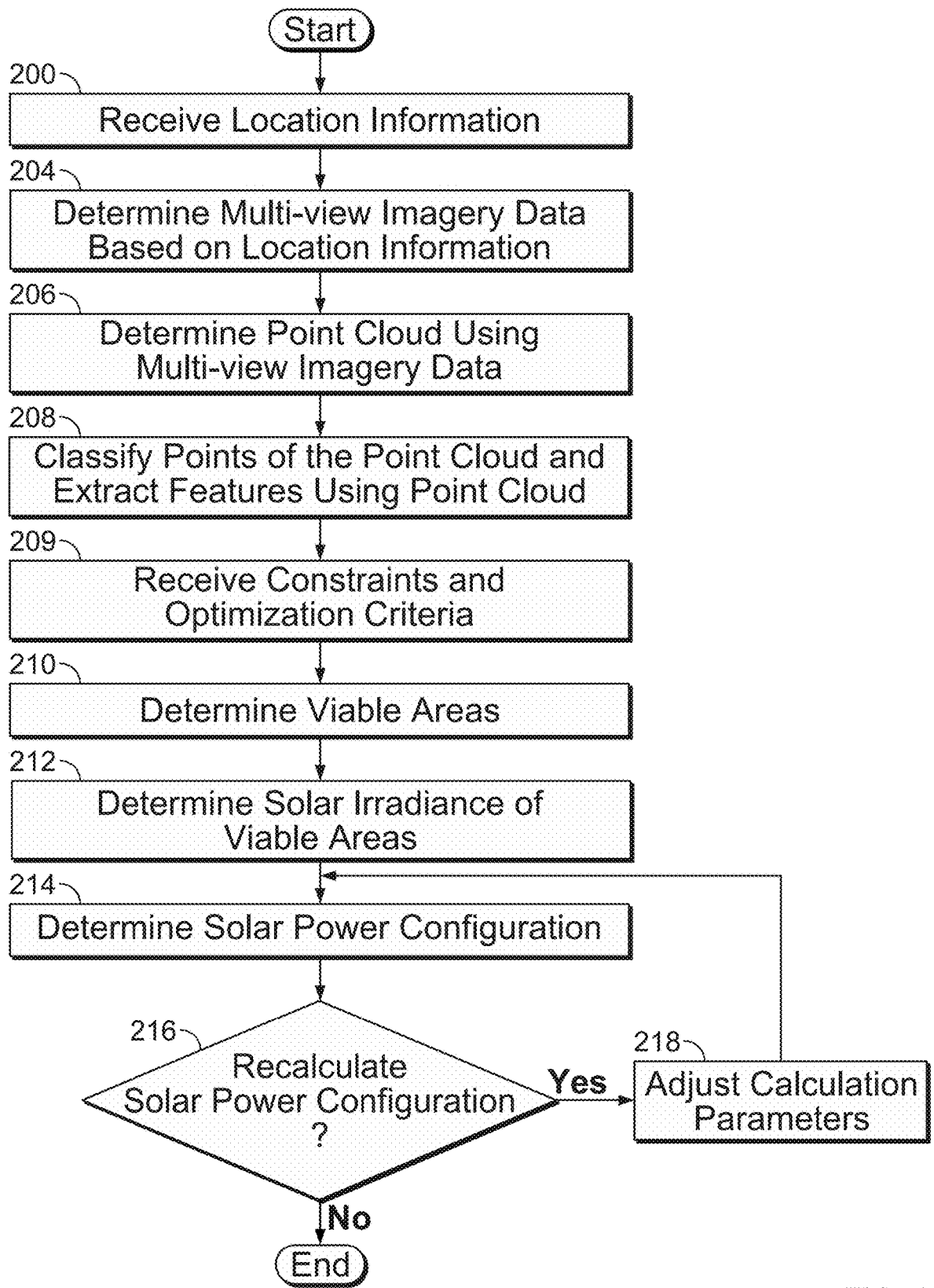
FIG. 2 is a flow diagram illustrating an embodiment of a process for determining an active solar area.

FIG. 2 is a flow diagram illustrating an embodiment of a process for determining a viable solar area. In some embodiments, the process of FIG. 2 is implemented on viable solar area determination system 104 of FIG. 1. In the example shown, in 200 a location information is received. For example, a user provides a location of a residence, site, commercial building, or other location that needs to be assessed for a solar installation. In some embodiments, the automated feature extraction and identification technology takes high-resolution geospatial data for large geographic areas, parses the data into features (e.g., defined in X, Y, Z coordinates and by various qualities of the image and objects, such as spectral qualities), and assigns features to individual sites. In some embodiments, official parcel boundary lines (e.g., legal definition of a property) are used to determine which features are directly associated with a particular site. In some embodiments, a site is defined as any area of ground or structure that can accommodate a solar electricity system.

In the example shown, in 204 multi-view imagery data is determined based on the location information. For example, appropriate data is determined and retrieved associated with the location (e.g., aerial photographic data around the location indicated by the location information). In various embodiments, multi-view imagery data includes one or more of the following, and can have different specifications dependent on the type of result being targeted such as a man-made structure site or relative heights of nearby trees, or relative height of a distant mountain:

- a number of views of each point on the ground from different viewpoints (e.g., 2, 3, 4, 5, etc. views from varying angles);
- a forward overlap of each successive frame in a single flight line covering the scene captured in the previous frame (e.g., 70%, 80%, etc. overlap between each successive frame);
- a lateral or side overlap of each flight line over the previous flight (e.g., 30%, 40%, 50%, etc. overlap side to side between each flight line);
- a minimum distortion of image frames and global positioning system (GPS)/inertial measurement unit (IMU) metadata;
- a specific range of image resolution (e.g., 0, 1, 2, etc. centimeters), that is, the distance between pixel centers measured on the ground;
- data stored corresponding to a standard (e.g., log ASCII standard (LAS));
- red, green, blue (RGB) information in the designated fields (e.g., 16, 32, etc. bit depth); and
- near infra-red (NIR) information in the intensity field (e.g., 12, 16, etc. bit depth).

In various embodiments, multi-view imagery data includes one or more of the following: light imaging, detection, and ranging (LIDAR) data, radio detection and ranging (RADAR) data, RGB hyperspectral data, thermal infrared data, or any other appropriate data.

In some embodiments, a check is performed to determine whether the data is adequate. In some embodiments, in the event that data is not adequate, the system indicates that data is not adequate and more data is requested and/or automatically retrieved. In other embodiments, when data is not available, localized multi-view imagery data is downloaded from a third party using an API.

In the example shown, in 206 a point cloud is determined using the orthophoto data. For example, orthophoto data has overlapping images (e.g., 80% overlap in the direction of flight and 30% overlap between lines of flight) whose points are matched so that 3 dimensional coordinates can be extracted from the overlapping point data. In some embodiments, remote sensors in unmanned aerial vehicles (UAV's), manned aircraft, or satellites collect orthophoto data. In some embodiments, raw images generated from sensors are stitched together and pan-sharpened. In some embodiments, aerial triangulation algorithms are applied to the "stitched" images to the specified overlap requirement of that particular application. In some embodiments, metadata are geographically projected onto the stitched images to enable the assignment of coordinates to each point for subsequent processes. In some embodiments, the resulting raw 2D orthophotos are geographically projected onto an image of the earth in a raw, unmosaiced manner.

In the example shown, in 208 points of the point cloud are classified and features are extracted using the point cloud. For example, ground, vegetation, structure and other features are extracted using the point cloud information. In some embodiments, ground points are classified by determining points in a plane that are low. In some embodiments, vegetation points are classified by the signature associated with the points in an infrared image. In some embodiments, structure points are classified by determining points that are above the ground plane. In some embodiments, using aerial triangulation methods in conjunction with 3D photogrammetric reconstruction technology, the system automatically detects pixels corresponding to the same physical point. Using the proper overlap specification, relative relationships of photos and accurate 3D shapes of the location is calculated. Using numerous methods including photogrammetry, computer vision and geometry, the technology reconstructs 3D man-made structures, natural surfaces, and vegetation for all areas collected, the output of which are called 3D point clouds. In some embodiments, the system automatically extracts the features of a 3D point cloud as vectors and assembles the vectors into shapes, polygons, and images. The system classifies each feature by type, such as mounting plane, obstruction, other site feature, etc. The technology extracts the exact dimensions (X,Y,Z) of each feature and extracts the geographic metadata of each point to ensure that the individual feature vectors can be used to generate a 3D model of every site with highly accurate absolute and relative positional relationships between mounting planes and the obstructions. Solar array designs rely on z coordinate determination to calculate the slope (vertical steepness/height) of features at the site, which is necessary to accurately estimate energy production by the solar system, and to accurately project shading from far-horizon, near-horizon, and local obstructions onto the mounting planes.

In 209, constraints and optimization criteria are received. For example, design constraints (e.g., electrical, regulatory, mounting, racking constraints, etc.) and design goals (e.g., power production maximization, matching a percentage of current usage, minimizing footprint, site areas to exclude from the analysis, etc.) are received that impact the determination of viable area, incident solar radiation, and layout of a solar installation. In some embodiments, databases (e.g., of point cloud data, of viable solar area, of energy potential of viable area) can be accessed instead in place of part of the process in FIG. 1.

In 210, viable areas are determined. For example, an unobstructed roof plane is identified by isolating the corners of the roof and then determining the points that are outlined by the corners that lie within a plane. In another example, an air conditioning unit on a rooftop is identified by isolating the corners of the air conditioning unit's planes and then determining the points that are outlined by the various corners. In 212, solar incidence of the viable areas are determined. For example, the solar radiation incident on each area (e.g., each square foot) is determined over the course of a day and a year taking into account occluded sunlight due to structures, vegetation, or distant elevated terrain. In 214, solar power configuration is determined. For example, a layout is determined for a solar power configuration based on the incident solar radiation available and the constraints input to the system. In some embodiments, the highly accurate feature data enables the system to optimally design a solar energy system, which accounts for all site obstructions, adjacent obstructions that could shade the site, and very accurate shading calculations. The features that are extracted and used in the automated design process include, but are not limited to:
   mounting planes—the technically different areas of a site, largely planar and often differentiated by unique orientations in 3D space, on which solar panels can be mounted;
   obstructions on each mounting plane (e.g., chimneys, vents, skylights, air conditioners, in the case of a rooftop site);
   obstructions adjacent to the site (e.g., trees, telephone poles, adjacent buildings, hills); and
   near-horizon and far-horizon landscape features (e.g., forests, hills, mountains).
In some embodiments, in 214 a purchase quotation is automatically determined based on the solar power configuration, preset selling parameters, and user-defined preferences.

In the example shown, in 216 it is determined whether the solar power configuration is to be recalculated. For example, it is determined whether a user desires to change optimization criteria, constraint criteria, vegetation trimming criteria, add vegetation, etc. and recalculate system outputs (e.g., layout, solar incidence, viable areas, etc.). In the event that the solar power configuration is to be recalculated, in 218 calculation parameters are adjusted and control passes to 214. For example, constraints or optimization criteria are modified or vegetation is modified (e.g., trimmed, added, etc.). In the event that the solar power configuration is not to be recalculated, the process ends.

Figure 3:
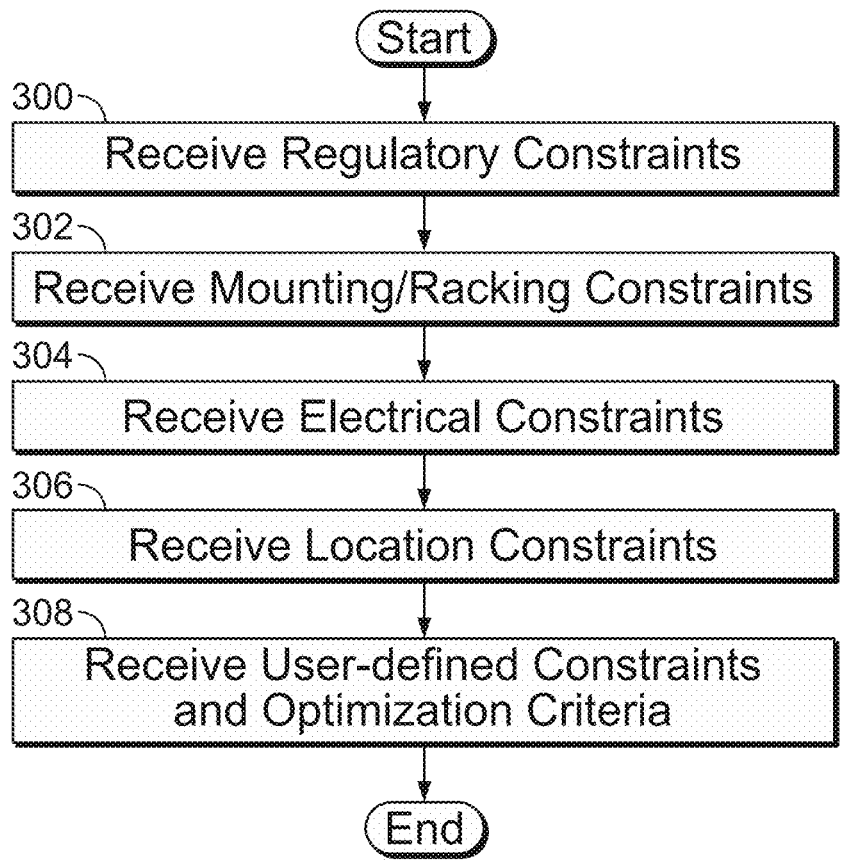
FIG. 3 is a flow diagram illustrating an embodiment of a process for receiving constraints and optimization criteria.

FIG. 3 is a flow diagram illustrating an embodiment of a process for receiving constraints and optimization criteria. In some embodiments, the process of FIG. 3 is used to implement 209 of FIG. 2. In the example shown, in 300 regulatory constraints are received. In various embodiments, regulatory constraints include one or more of the following: constraints associated with an authority having jurisdiction (e.g., a city, a county, a state, etc.), fire marshal constraints, occupational safety and health administration (OSHA) constraints (e.g., setbacks from roof edge), or any other appropriate constraints. In 302, mounting/racking constraints are received. For example, inter module spacing, inter row spacing, array size constraints are received. In 304, electrical constraints due to module and inverter selection are received. For example, electrical string length constraints (e.g., 1-19 modules per string, 1-13 strings per inverter, etc.), system voltage constraints (e.g., 600V-1500V), maximum power point tracker constraints are received. In 306, location constraints are received. For example, equipment location on roof constraint due to shading impact on incident solar radiation. For example, set back from equipment, string lengths constraints (e.g., 1-19 modules per string, 1-13 strings per inverter, etc.). In 308, user-defined constraints and optimization criteria are received. For example, user constraints, design goals, quotation goals, are received from a user. In various embodiments, a system constraint includes one or more of the following:
   a mounting plane limit—limiting the energy production system to only certain mounting planes at the site;
   an array shape constraint—constraining the arrays to a geometric shape to line up the panels along some axis, roof edge, etc.;
   a component constraint—constraining the design to include specific components (e.g., solar panels, inverters);
   a minimum irradiance level constraint—constraining the layout such that a minimum irradiance level for a panel is met;
   constraining maximum tree and foliage heights based on distances and direction from specific solar panels;
   or any other appropriate constraint. In some embodiments, a user/consumer enters a constraint or control option and the system recalculates the solar energy layout or placement for the user/consumer. For example, a user/consumer can specify that maximum allowable amount of sunlight shading (e.g., by trees or roof obstacles) on each solar panel in the designed system for the entire year or for different times of the year (e.g., the time of year when utility electricity pricing is highest), or that a specific area of their roof is not strong enough to support solar panels or will be removed soon such that that area would be excluded from the analysis. In some embodiments, the software removes any solar panels in the designed energy production system that do not meet that shading criteria and recalculates the new optimal design under this added shading constraint.

Figure 4:
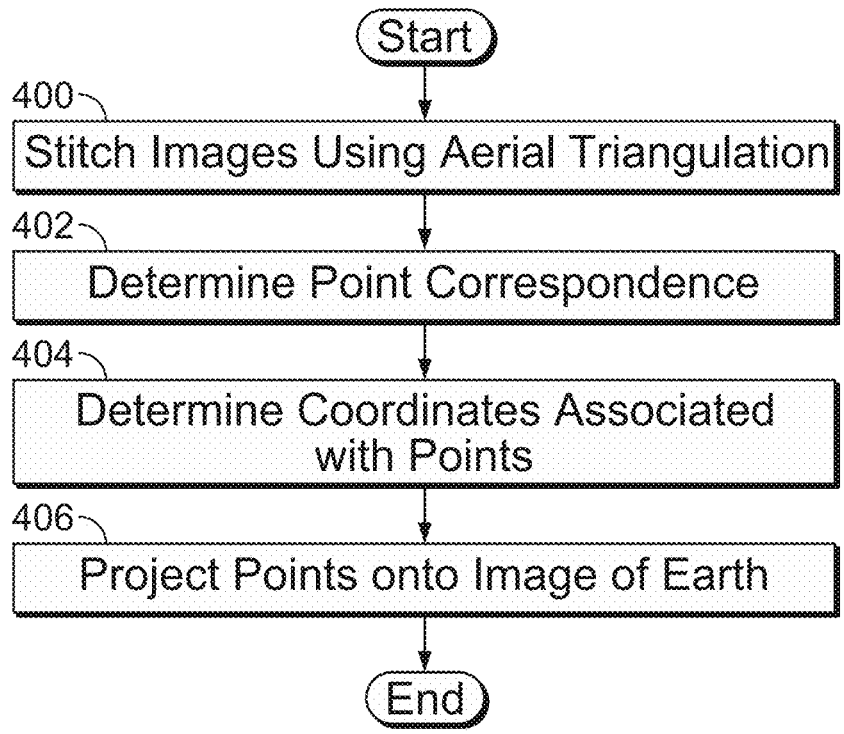
FIG. 4 is a flow diagram illustrating an embodiment of a process for determining a point cloud.

FIG. 4 is a flow diagram illustrating an embodiment of a process for determining a point cloud. In some embodiments, the process of FIG. 4 is used to implement 206 of FIG. 2. In the example shown, in 400 images are stitched together using aerial triangulation. In 402, point correspondence is determined. In 404, coordinates associated with points are determined. In 406, the points are projected onto images of earth. In some embodiments, metadata are geographically projected onto the images. In some embodiments, dense point clouds are determined using a dense image matching algorithm that is based on, for example, the Semi-Global Matching approach wherein each pixel from the various images are matched to its neighboring pixels in order to derive a dense point cloud based on the amount of pixels matched. By merging redundant disparity estimations of multiple stereo models, the precision and robustness of the resulting point clouds is increased.

Figure 5:
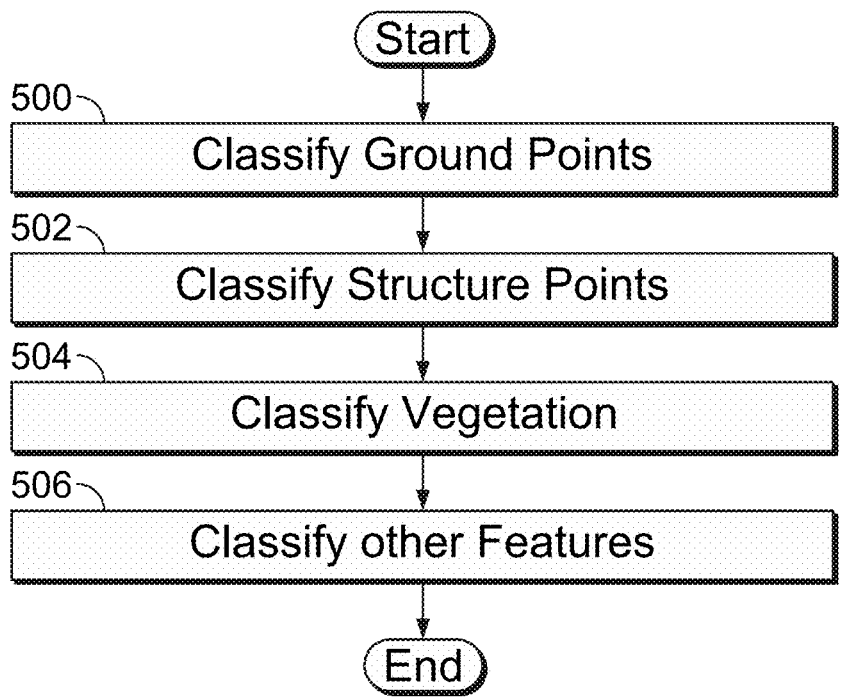
FIG. 5 is a flow diagram illustrating an embodiment of a process for classifying points and extracting features.

FIG. 5 is a flow diagram illustrating an embodiment of a process for classifying points and extracting features. In some embodiments, machine learning is used to generate classifications and extracted features. In some embodiments, the process of FIG. 5 is used to implement 208 of FIG. 2. In the example shown, in 500 ground points are classified. In 502, structure points are classified. In 504, vegetation is classified. In some embodiments, vegetation is identified using infrared imagery. In 506, other features are classified. For example, man-made structures, adjacent structures, and other types of structures are classified. In some embodiments, parking lots and parking lot structures are classified to determine solar area for carports.

In various embodiments, the types of features and vectors that are extracted from the 3D point clouds include:
a. Buildings
  i. Roof planes of each building
  ii. Obstructions on roof planes (Parapets, signs, heating and air conditioning units, blowers, vents, water pipes, skylights, chimneys, existing solar panel arrays, and any other items on the roof planes)
b. Adjacent obstructions
  i. Poles (telephone, power)
  ii. Power lines (conductors)
  iii. Cell towers
  iv. Trees and bushes
  v. Hills
c. Other features impacting the site
  i. Open terrain, both nearby and distant
  ii. Parking lots, including vehicle spaces, curbs, vegetation, and light poles
  iii. Carports
  iv. Vehicles, electric and non-electric
  v. Pools and spas
  vi. Electric car charging stations
  vii. Solar systems (either on the ground, in parking lots, or on roof planes or other man-made structures).
  viii. Water In some embodiments, the system enables high volume processing required for real-time software user/consumer interaction. The system provides a multi-stage automated processing pipeline that takes different types of input from various and diverse sources, such as imagery collection, 3D point cloud generation, feature extraction, and ultimately output the pre-processed data to a solar design software product or to other solar products or non-solar products for downstream processing. In some embodiments, all output is deployed in the cloud.

In some embodiments, for a given site, the automated feature extraction technology takes each vector/feature and its associated metadata and, using official parcel boundary lines (legal definition of a property), determines which features are associated with which parcel. Additional site-related information (1) from various and diverse sources, such as third-party and proprietary databases, or (2) extracted from the feature data, are overlaid onto the feature set. Such site-related information includes property owner, address, size of mounting plane, electric utility serving the property, type of building, estimated electricity consumption at the site, etc. This data is critical to enable giving an accurate, interactive user/consumer experience, such as for a prospective solar customer in an online product retailing embodiment.

Figure 6:
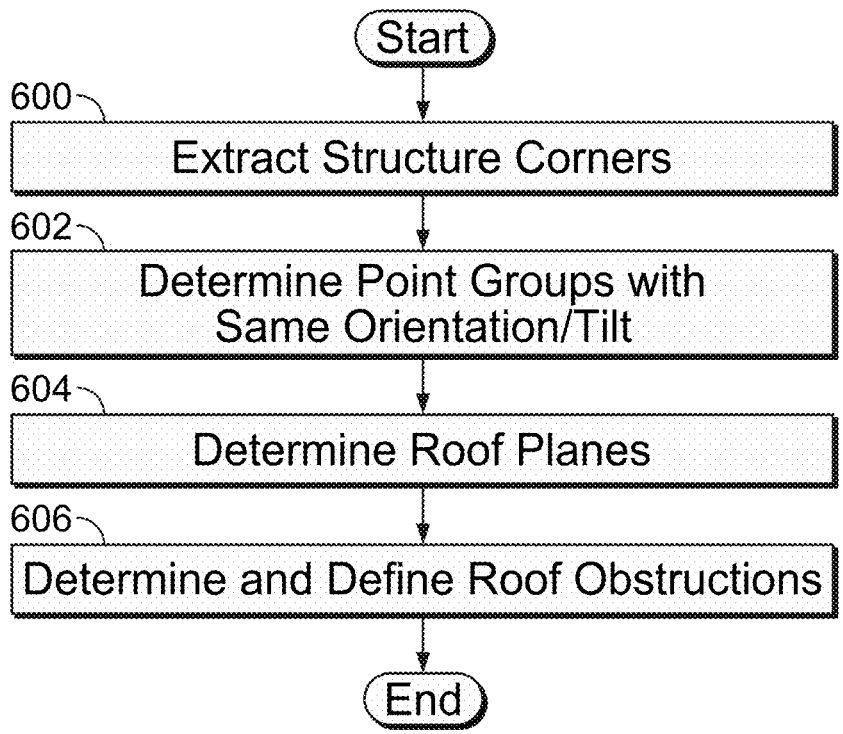
FIG. 6 is a flow diagram illustrating an embodiment of a process for determining active areas of a rooftop, though the general process is applicable to parking lots, open ground and other potential sites.

FIG. 6 is a flow diagram illustrating an embodiment of a process for determining viable areas of a rooftop, though the general process is applicable to parking lots, open ground and other potential sites. In some embodiments, the process of FIG. 6 is used to implement 210 of FIG. 2. In the example shown, in 600 structure corners are extracted. In 602, adjacent points are determined with the same orientation/tilt. In 604, roof planes are determined. In 606, roof obstructions are determined and defined. For example, obstructions are items that protrude from a plane of interest, such as pipes or heating ventilation and air conditioning (HVAC) units, chimneys, skylights, vents, solar panels, parapet walls, etc. In various embodiments, the viable area comprises a roof area, a parking lot area, a field, or any other appropriate area.

Figure 7:
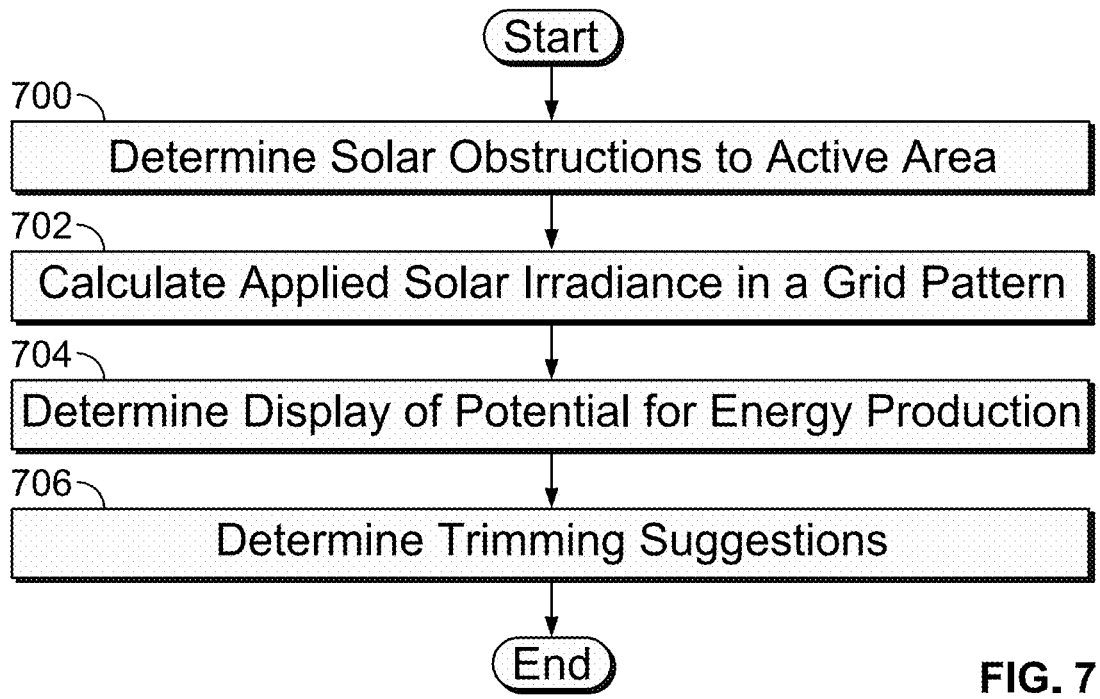
FIG. 7 is a flow diagram illustrating an embodiment of a process for determining solar incidence of active areas.

FIG. 7 is a flow diagram illustrating an embodiment of a process for determining solar incidence of viable areas. In some embodiments, the process of FIG. 7 is used to implement 212 of FIG. 2. In the example shown, in 700 solar obstructions to viable area are determined. For example, the system is able to consider all features that are associated with a site and accurately apply solar irradiance to the site to accurately calculate daily, seasonal, and annual shading. The system takes into account the size and location of any features that obstruct the solar irradiance from reaching parts of any mounting plane (e.g., a line of site analysis). The extracted features associated with a site include any obstructions (e.g., trees, structures, and landscape) that have a shading impact on the mounting plane. In 702, applied solar irradiance is calculated in a grid pattern. For example, for a given site, the technology calculates and applies solar irradiance values to multiple, very granular points on each mounting plane in a grid pattern. In some embodiments, the solar irradiance is sourced from U.S. government data, private data collection companies, or both, or any other appropriate database. The analysis accounts for the solar irradiance striking each point on the mounting plane for each hour of the year, for the exact location of the site. In some embodiments, solar irradiance that hits each point of a mounting plane is compared to other points in the region and ranges of irradiance levels are classified into a color scale. In 704, a display of potential for energy production is determined. For example, a heat map is generated. In some embodiments, multi-colored points are displayed as an overlay on the mounting planes at the site (extracted features with defined boundaries). The heat map allows consumers and users to understand at a glance whether their site has high or low potential for solar energy production, and which areas of their site is have the most potential for solar. In 706, trimming suggestions are determined. In some embodiments, the system considers the impact of shading from trees on solar irradiance of the viable area. The technology automatically identifies trees that shade sometime during the year the available area for installing solar panels, and the characteristics of those trees, such as species, average growth rates, and typical growth directions and rates. For each set of identified trees, the system offers the user/ consumer scenarios of which trees are trimmed and by how much each such that the user's/consumer's energy production and hence financial return is modified accurately and instantly. In some embodiments, the system optimizes the financial return of a solar system evaluated for a site by comparing rapidly very many scenarios of the costs of and designs resulting from tree trimming throughout a 25 year energy production system life, comparing such parameters as the higher cost of the larger solar system enabled through tree trimming vs the cost of the tree trimming vs the cost savings from using solar electricity rather than utility electricity. Some scenarios might show the cost of the tree trimming is greater than the cost savings from increased solar energy production, while some scenarios might show the cost of tree trimming is less than the cost savings from increased solar energy production.

In some embodiments, a user/consumer indicates a degree of trimming desired and energy production is recalculated based on the input trimming of the tree(s). The user/consumer specifies how much of the tree they would like to trim, the system determines a solar panel array layout of the energy production system to reflect the new trimmed tree height(s), the system calculates the benefit to the user/consumer of the new energy production system design including the lifetime cost of repeated tree trimmings, and renderings of the smaller trimmed trees are created by the system and inserted into the user's/consumer's display of the energy production system on the site. Thus, the user/consumer can interact with the system by inputting various trimming scenarios and assessing which outcome is most desirable.

Figure 8:
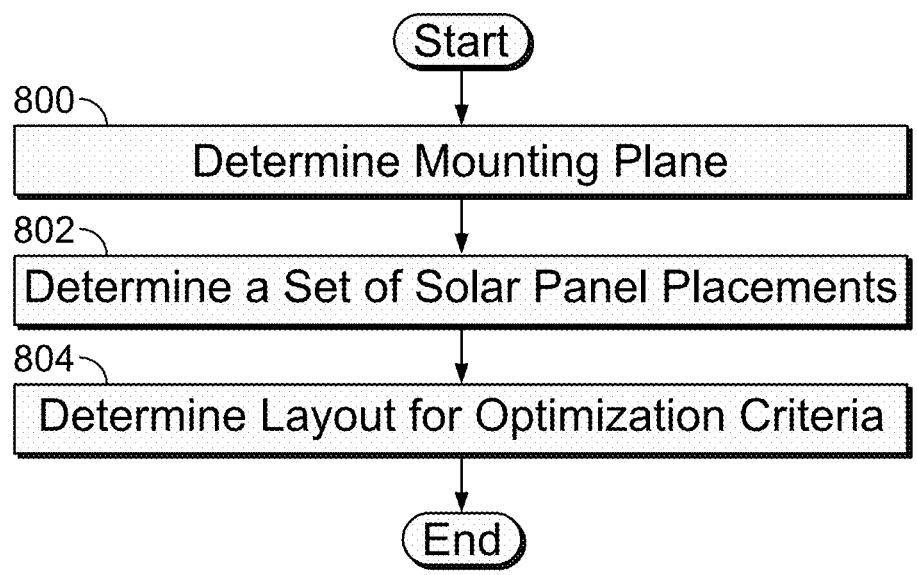
FIG. 8 is a flow diagram illustrating an embodiment of a process for determining a solar power configuration.

FIG. 8 is a flow diagram illustrating an embodiment of a process for determining a solar power configuration. In some embodiments, the process of FIG. 8 is used to implement 214 of FIG. 2. In the example shown, in 800 a mounting plane is determined. In 802, a set of solar panel placements are determined. For example, the system automatically determines placement of panels on each plane using regulatory, mounting, and electrical constraints and performs panel-level shading analyses to ensure performance of panels to the input constraints. In various embodiments, a set of placements is determined to enable selection based on constructability, costs of installation, and time-of-use pricing of electricity or any other appropriate factor. In some embodiments, different solar system components are modeled as a part of the different placements of the set of placements. The placement accounts for any local permitting jurisdiction rules requiring the solar panel arrays to be setback a minimum distance from obstructions or building edges, or requiring specific number and widths of fireman access areas within the solar arrays or any other appropriate constraints. The technology can also optimize in considering the value and electrical characteristics of each string of solar panels (a string is a number of solar panels in series, electrically speaking). In some embodiments, stringing solutions are generated based on the panel and string shading. For example, the system enables constraining all solar panels in an electrical string to be placed in a location with similar irradiation levels to achieve particular electrical performance levels. As another example, the system accounts for differences between electrical DC-to-AC inverter features and types (e.g. micro inverters vs. string inverters, # of maximum power point trackers, etc.). In some embodiments, another mounting plane is selected and another set of placements is determined. In 804, a layout for the optimization criteria is determined. In some embodiments, the system runs multiple iterations to determine a set of design possibilities and evaluates the designs against the optimization criteria. The system automatically calculates parameters that are used to size and select an optimized design, such as:

- the total energy produced and the economic value of the energy produced by the solar panels for various layouts;
- the consumer's post-solar energy bill (considering utility rate tariff switches);
- the consumer's energy consumption (based on actual values or estimation algorithms); and
- the consumer's cost/payback/savings for each design using built in pricing algorithms.

In various embodiments, the design optimization criteria comprise one or more of the following:

- maximizing solar energy production (largest system possible);
- maximizing financial rate of return and/or total return from solar system;
- achievement of certain system cost target;
- achieving criteria enabling financing options (e.g., lease, loan, cash, electricity sales agreement, etc.); and
- percentage of electric bill offset by solar production;
- achieving a minimum level of environmental benefit; or
- any other appropriate criteria.

Figure 9A:
FIGS. 9A and 9B are example images illustrating input to an embodiment of a system for determining an active area.
Figure 9B:

FIGS. 9A and 9B are example images illustrating input to an embodiment of a system for determining a viable area. In some embodiments, the images of FIGS. 9A and 9B are stored in multi-view imagery database system 106 of FIG. 1. FIG. 9A shows an example input image for a residential location. In the example shown, roof area 900 is shown as lighter area next to vegetation (e.g., tree 902) differentiated from ground area 904. FIG. 9B shows an example input image for a commercial location. In the example shown, roof area 910 is shown with HVAC equipment 912 adjacent to ground area 914.

Figure 10A:
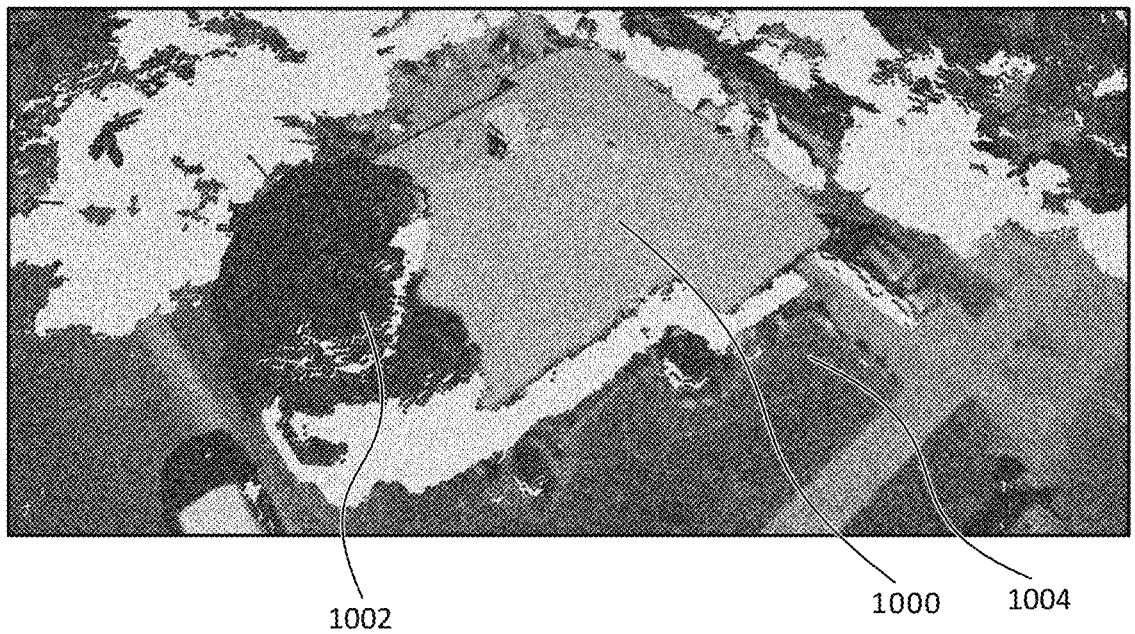
FIGS. 10A and 10B are example images illustrating a point cloud generated by an embodiment of a system for determining an active area.
Figure 10B:
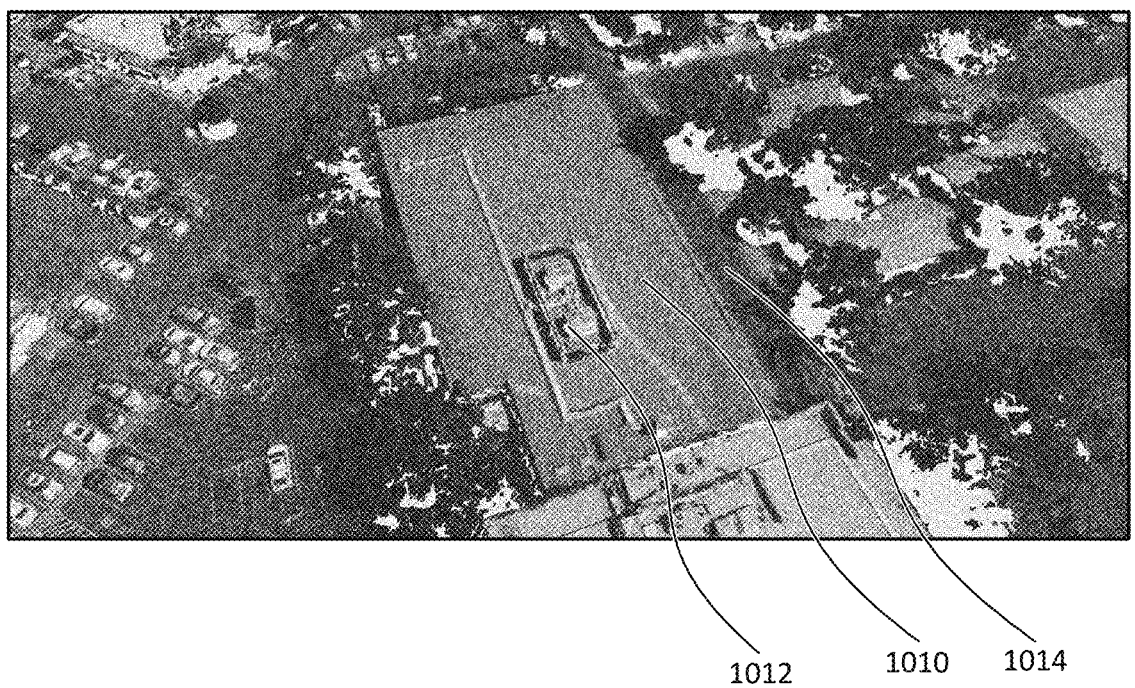

FIGS. 10A and 10B are example images illustrating a point cloud generated by an embodiment of a system for determining a viable area. In some embodiments, the images of FIGS. 10A and 10B are generated by viable solar area determination system 104 of FIG. 1. FIG. 10A shows an example point cloud for a residential location with three dimensional information extracted and displayed as a projected view. In the example shown, roof area 1000 is shown as lighter area next to vegetation (e.g., tree 1002) differentiated from ground area 1004. FIG. 10B shows an example point cloud for a commercial location with three dimensional information extracted and displayed as a projected view. In the example shown, roof area 1010 is shown with HVAC equipment 1012 adjacent to ground area 1014.

Figure 11A:
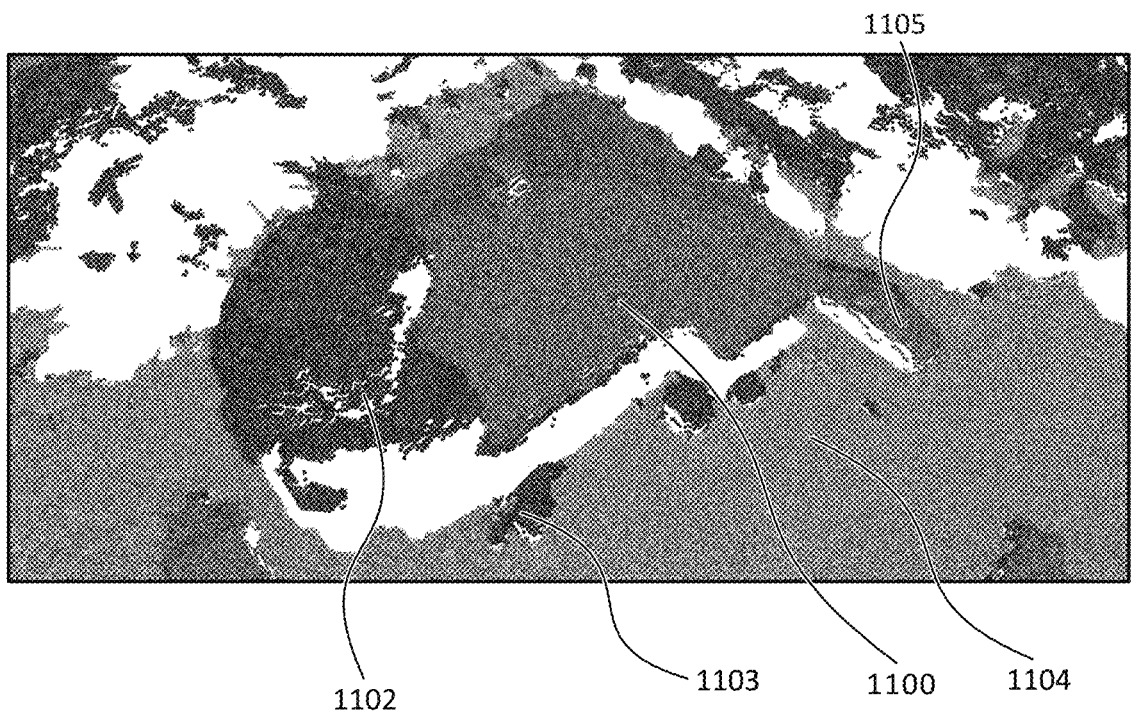
FIGS. 11A and 11B are example images illustrating a point cloud with classification that is generated by an embodiment of a system for determining an active area.
Figure 11B:
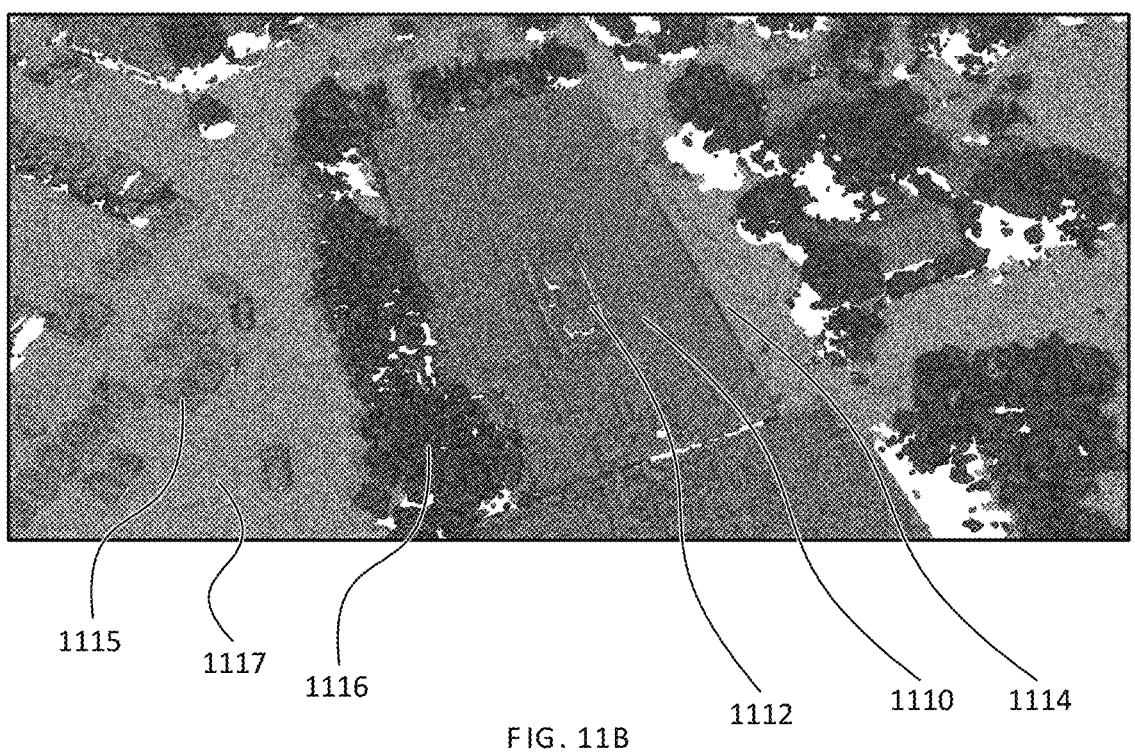

FIGS. 11A and 11B are example images illustrating a point cloud with classification that is generated by an embodiment of a system for determining a viable area. In some embodiments, classification is accomplished using machine learning algorithms. In some embodiments, the images of FIGS. 11A and 11B are generated by viable solar area determination system 104 of FIG. 1. FIG. 11A shows an example point cloud with classification for a residential location with three dimensional information extracted and displayed as a projected view. In the example shown, structure 1100 (roof) and structure 1105 (car) are shown as lighter area next to vegetation (e.g., tree 1102, bush 1103, etc.) differentiated from ground area 1104. FIG. 11B shows an example point cloud with classification for a commercial location with three dimensional information extracted and displayed as a projected view. In the examples shown, points of the point cloud are classified as vegetation, ground, and structure. In the example shown, structure 1110 (roof area) is shown with structure 1112 (HVAC equipment) on top adjacent to ground area 1114 with vegetation 1116 next to structure 1110 and structure 1115 (car) above ground area 1117.

Figure 12A:
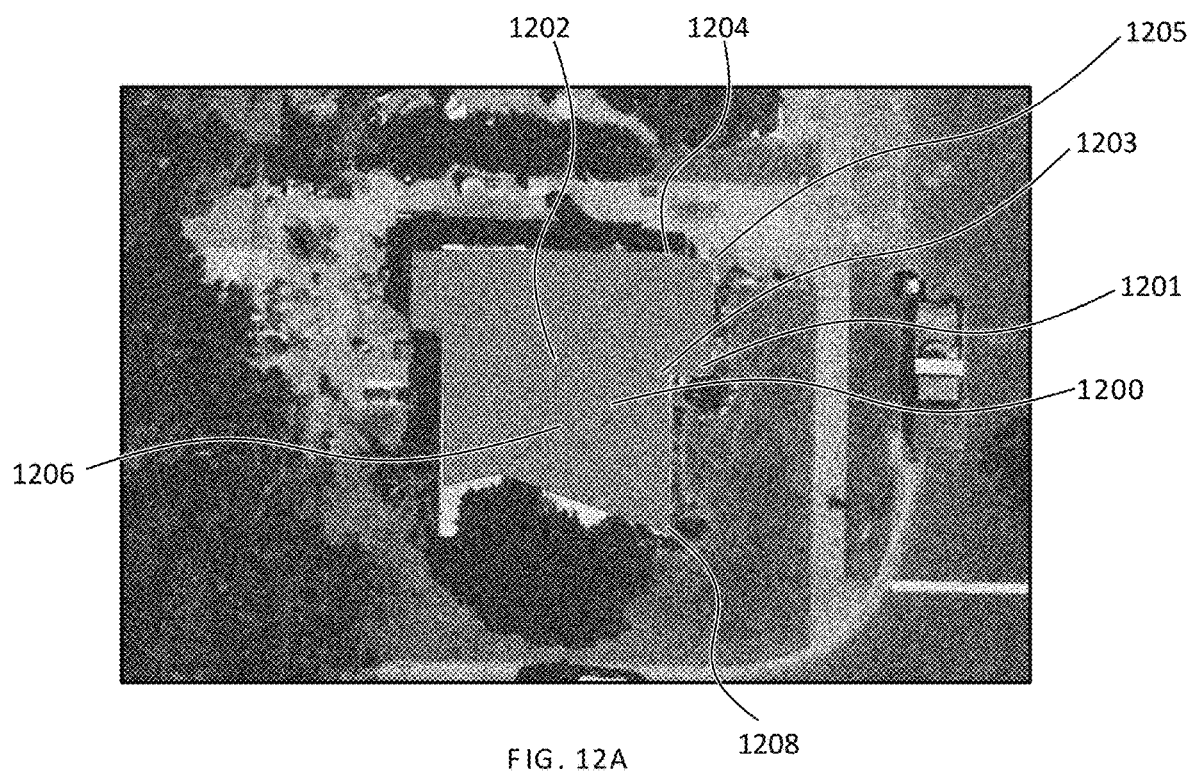
FIGS. 12A and 12B are example images illustrating active or viable areas determined by an embodiment of a system for determining an active area.
Figure 12B:
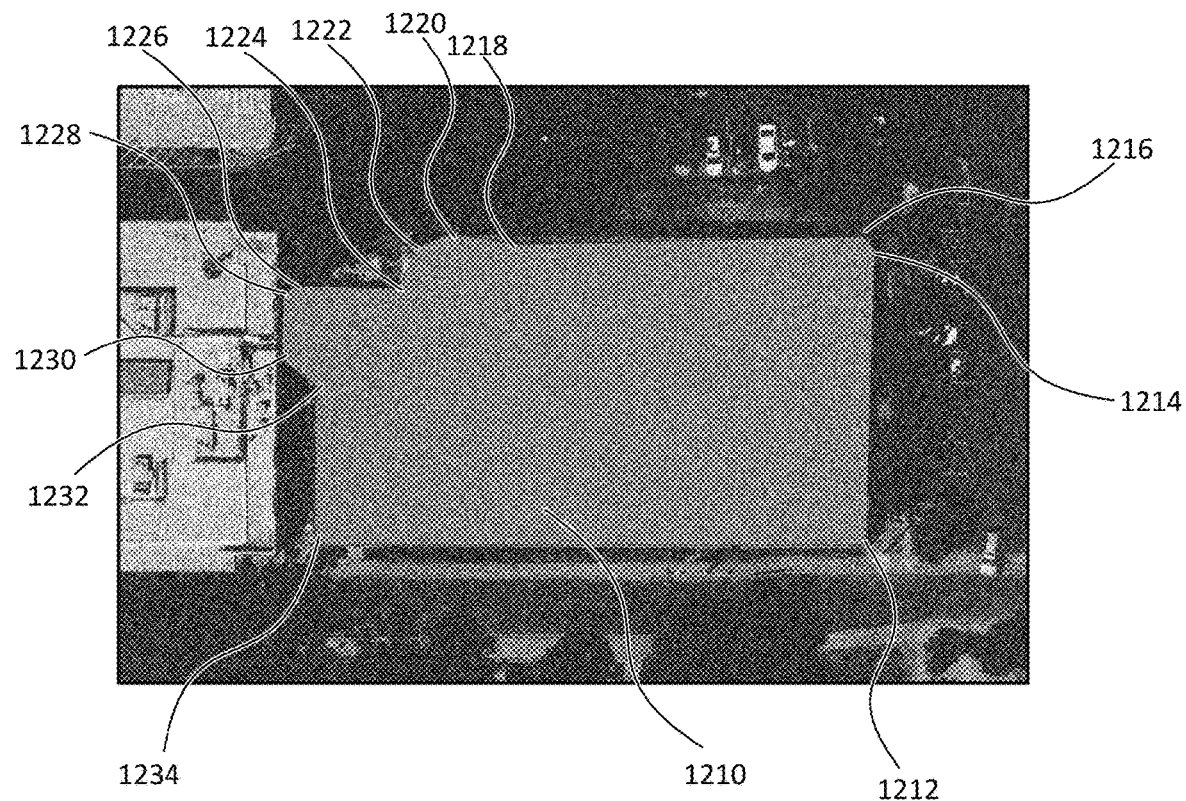

FIGS. 12A and 12B are example images illustrating active or viable areas determined by an embodiment of a system for determining an active area. In some embodiments, the images of FIGS. 12A and 12B are determined by viable solar area determination system 104 of FIG. 1. FIG. 12A shows an example active area with classification for a residential location with the simple roof indicated as the active area. In the example shown, corners are identified (e.g., corner 1201, corner 1202, corner 1203, corner 1204, corner 1205, corner 1206, corner 1208, etc.) and roof plane 1200 defined as the set of points that are defined using the corners. FIG. 12B shows an example active area with classification for a commercial location with the simple roof indicated as the active area. In the example shown, corners are identified (e.g., corner 1212, corner 1214, corner 1216, corner 1218, corner 1220, corner 1222, corner 1224, corner 1226, corner 1228, corner 1230, corner 1232, corner 1234, etc.) and roof plane 1210 defined as the set of points that are defined using the corners.

Figure 13A:
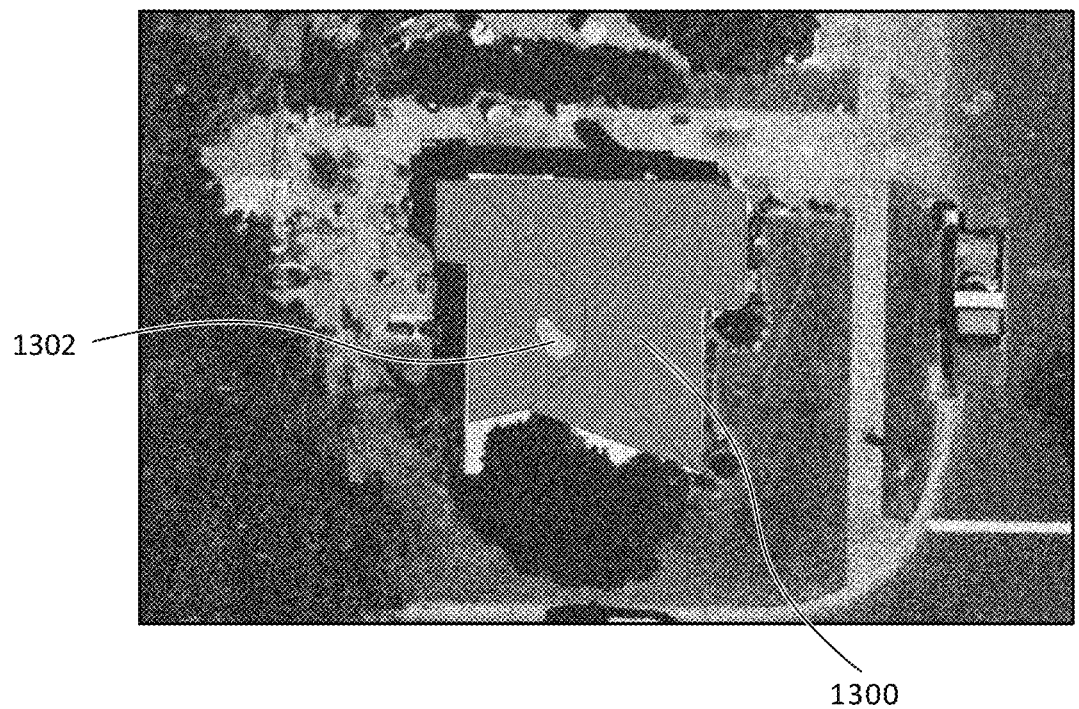
FIGS. 13A and 13B are example images illustrating active areas with obstructions determined by an embodiment of a system for determining an active area.
Figure 13B:
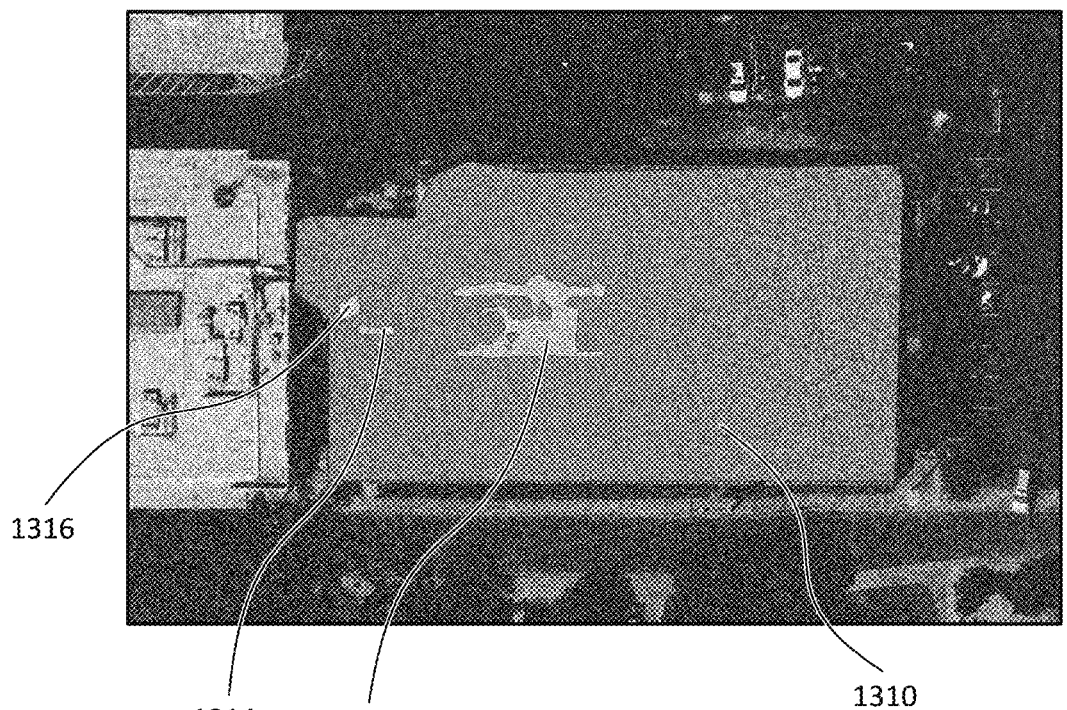

FIGS. 13A and 13B are example images illustrating viable areas with obstructions determined by an embodiment of a system for determining a viable area. In some embodiments, the images of FIGS. 13A and 13B are determined by viable solar area determination system 104 of FIG. 1. FIG. 13A shows an example active area with obstructions. In the example shown, active area 1300 (roof) and obstruction 1302 (chimney) are indicated. FIG. 13B shows an example active area with classification for a commercial location with obstructions. In the example shown, active area 1310 (roof) and obstruction 1312 (HVAC) and obstruction 1314 (duct) and obstruction 1316 (chimney) are indicated.

Figure 14A:
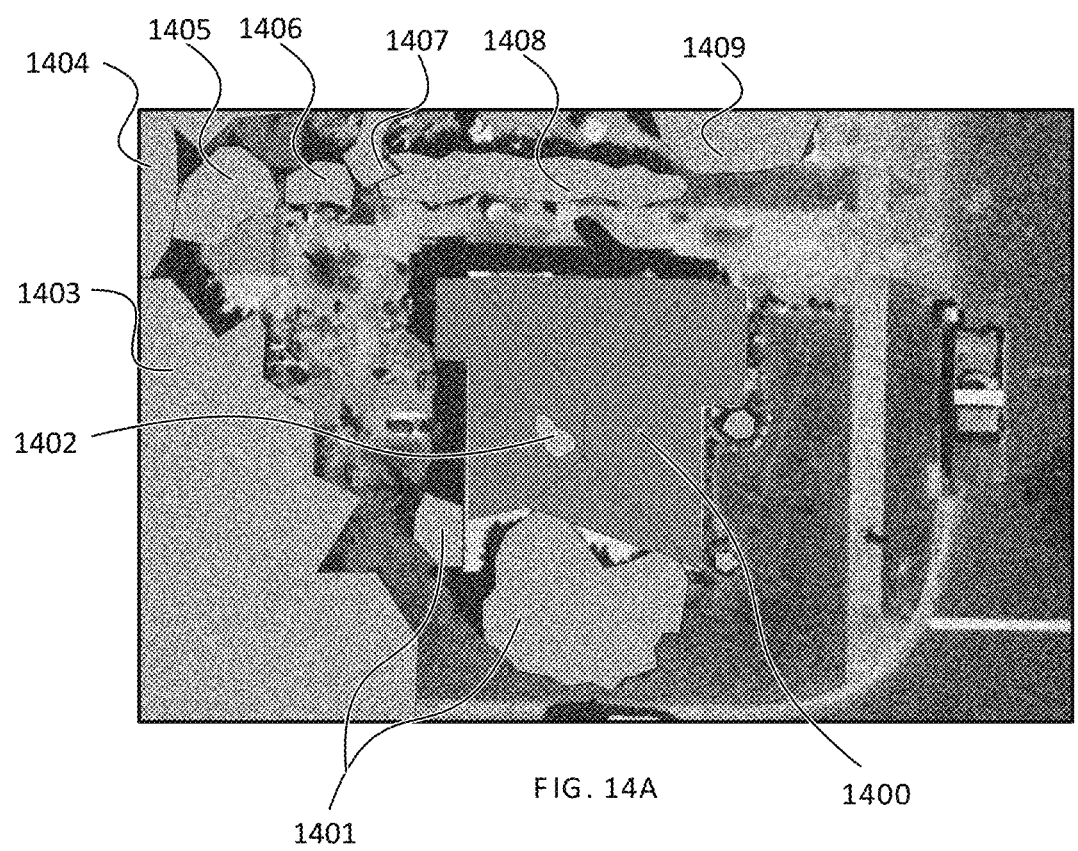
FIGS. 14A and 14B are example images illustrating active areas with obstructions and vegetation determined by an embodiment of a system for determining an active area.
Figure 14B:
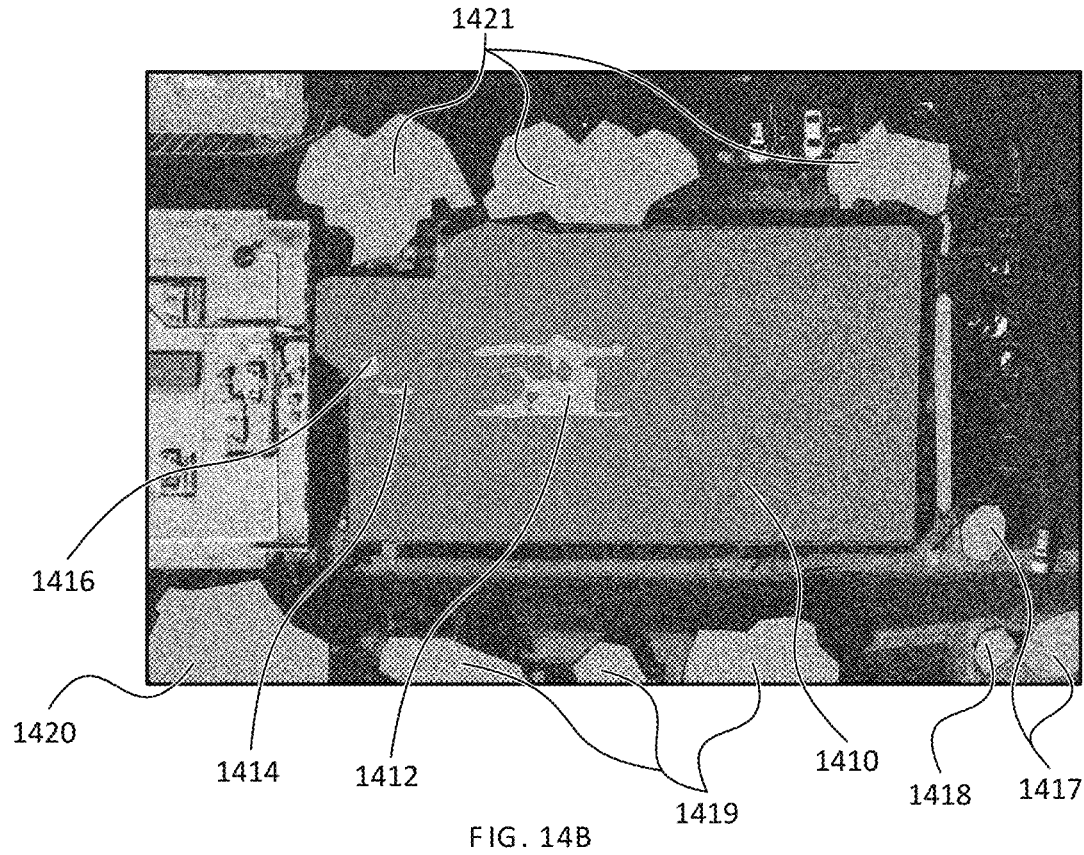

FIGS. 14A and 14B are example images illustrating viable areas with obstructions and vegetation determined by an embodiment of a system for determining a viable area. In some embodiments, the images of FIGS. 14A and 14B are determined by viable solar area determination system 104 of FIG. 1. FIG. 14A shows an example active area with obstructions and vegetation. In the example shown, active area 1400 (roof), obstruction 1402 (chimney), and vegetation (e.g., vegetation 1401, vegetation 1403, vegetation 1404, vegetation 1405, vegetation 1406, vegetation 1407, vegetation 1408, vegetation 1409, etc.) are indicated. FIG. 14B shows an example active area with classification for a commercial location with obstructions and vegetation. In the example shown, active area 1410 (roof), obstruction 1412 (HVAC), obstruction 1414 (duct), obstruction 1416 (chimney), vegetation (e.g., vegetation 1417, vegetation 1418, vegetation 1419, vegetation 1420, vegetation 1421, etc.) are indicated.

Figure 15A:
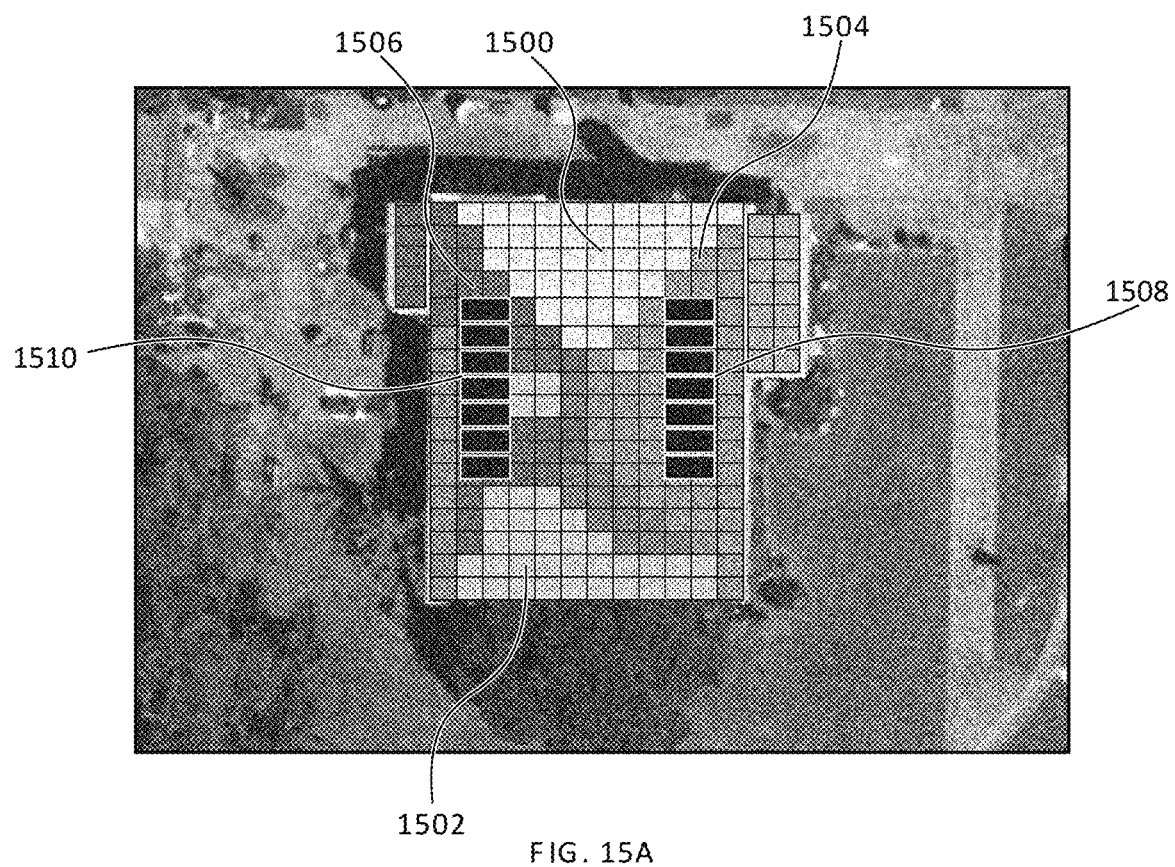
FIGS. 15A and 15B are example images illustrating heat map and solar panel layout determined by an embodiment of a system for determining an active area.
Figure 15B:
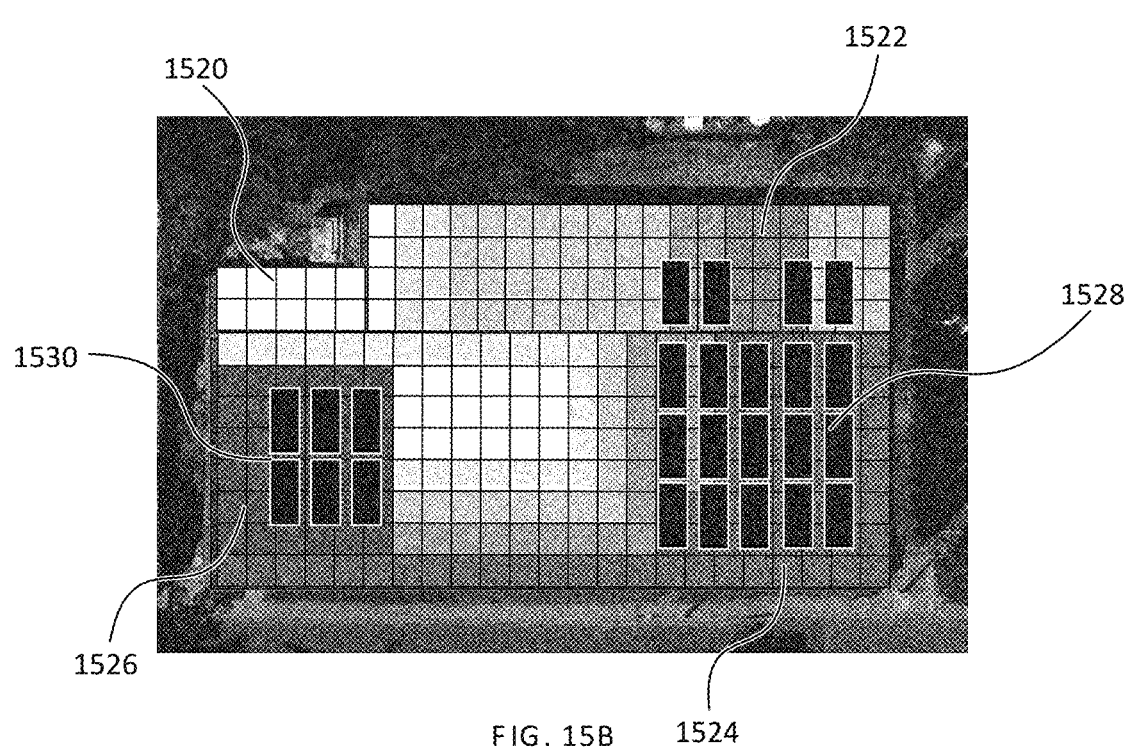

FIGS. 15A and 15B are example images illustrating heat map and solar panel layout determined by an embodiment of a system for determining a viable area. In some embodiments, the images of FIGS. 15A and 15B are determined by viable solar area determination system 104 of FIG. 1. FIG. 15A shows an example active area with different levels of solar irradiance as determined for square tiles of the active area and panel layout. In the example shown, levels of irradiance are indicated for different tiles (e.g., tiles with very low irradiance 1500, tiles with low irradiance 1502, tiles with medium irradiance 1504, tiles with high irradiance 1506, etc.). Set of panels 1508 and set of panels 1510 are shown superimposed on roof of residential structure. FIG. 15B shows an example active area with different levels of solar irradiance as determined for square tiles of the active area and panel layout. In the example shown, levels of irradiance are indicated for different tiles (e.g., tiles with low irradiance 1520, tiles with medium irradiance 1522, tiles with high irradiance 1524, tiles with highest irradiance 1526, etc.). Set of panels 1528 and set of panels 1530 are shown superimposed on roof of commercial structure.

In some embodiments, the processed data enables the system to offer a simple interface for consumers to instantaneously receive an accurate design and purchase quotation, and financial return projections for their site, one or more customized accurate costs from one or more solar system vendors. In some embodiments, the design is provided automatically to either multiple solar system vendors or automated quote generation software, and then once the quotes are received back they are ranked. Only the top ranked quotes are presented (e.g., the lowest three priced quotes, the two quotes with the highest financial return, the five largest system size quotes, etc., or some combination of criteria).

In some embodiments, the interface allows consumers to manipulate various options in the energy production system design (e.g., system size, specific brand components, etc.) and purchase structure (e.g., such as lease term, starting rate, third party power purchase price annual escalation rate, down payment amount, etc.) using sliders or other user interface that change the solar system design, pricing and savings calculations instantly and accurately.

In some embodiments, the system compares direct purchase of the solar system with different financing offerings, such as lease, loan, cash purchase, power purchase agreement, etc. In some embodiments, the system enables purchase of the energy production system immediately from a provider/vendor listed on the website or allows them to follow up with a provider/vendor for more information. In some embodiments, the system enables solar system providers to quote bids to the consumers that they can then select from.

In some embodiments, consumers are instantly provided via a website with a geospatial rendering of the accurate and optimized energy production system design layout overlaid onto a high resolution image of their site (e.g., roof, parking lot) in 2D or 3D.

In some embodiments, the system includes consumer/user identity verification as a barrier to someone different that the authorized user/consumer using the software system. In some embodiments, this user/consumer identity verification confirms that the user-provided email address domain name, the user-provided organization name, and the site address of the envisioned solar system all match.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining a viable area for solar radiation, comprising:
   an interface configured to:
      receive location information; and
   a processor configured to:
      determine imagery data based on the location information;

determine a point cloud using the imagery data, wherein the determining of the point cloud comprises to:
  determine points corresponding with a plurality of images of the imagery data;
  determine coordinates associated with the points; and
  project the points onto images of the earth to obtain a set of three dimensionally specified points;
determine ground points, vegetation points, and structure points using the point cloud, wherein determining the one or more features using the point cloud comprises to:
  classify ground points based on a determination of points in a plane;
  classify vegetation points based on a signature associated with points in an infrared image; and
  classify structure points based on a determination of points that are above a ground plane;
determine a viable area using the ground points, vegetation points, and structure points, comprises to:
  extract corners of a structure of the structure points, vegetation points, and structure points;
  determine adjacent points based on the corners, wherein the adjacent points have the same orientation or tilt;
  determine the viable area based on the adjacent points; and
  determine solar power configuration based on the viable area.

2. The system as in claim 1, wherein determining the point cloud includes stitching the imagery data.

3. The system as in claim 1, wherein determining the point cloud includes determining point correspondence.

4. The system as in claim 1, wherein the solar power configuration is based at least in part on a shading criteria.

5. The system as in claim 4, wherein the solar power configuration is determined based at least in part on an optimization criteria.

6. The system as in claim 5, wherein the optimization criteria comprise one or more of the following: maximum financial return of the solar system, maximum solar energy generation, or achievement of a system cost target.

7. The system as in claim 6, wherein the solar power configuration is determined based at least in part on a constraint criteria.

8. The system as in claim 7, wherein the constraint criteria comprises one or more of the following: a mounting plane limit, an array shape, a component constraint, a minimum irradiance level constraint, a regulatory constraint, a mounting constraint, a racking constraint, or an electrical constraint.

9. The system as in claim 4, wherein the processor is further configured to determine whether the solar power configuration is to be recalculated based at least in part on removing solar panels in the solar power configuration due to the shading criteria.

10. The system as in claim 9, wherein in response to a determination that the solar power configuration is to be recalculated, one or more calculation parameters are adjusted.

11. The system of claim 1, wherein the viable area comprises a roof area, a parking lot area, or an open ground area.

12. The system of claim 1, wherein the location information comprises an address of the location.

13. A method for determining a viable area for solar radiation, comprising:
  receiving location information;
  determining, using a processor, imagery data based on the location information;
  determining a point cloud using the imagery data, wherein the determining of the point cloud comprises:
    determining points corresponding with a plurality of images of the imagery data;
    determining coordinates associated with the points; and
    projecting the points onto images of the earth to obtain a set of three dimensionally specified points;
  determining ground points, vegetation points, and structure points using the point cloud, wherein determining the one or more features using the point cloud comprises:
    classifying ground points based on a determination of points in a plane;
    classifying vegetation points based on a signature associated with points in an infrared image; and
    classifying structure points based on a determination of points that are above a round plane;
  determining a viable area using the ground points, vegetation points, and structure points comprises:
    extracting corners of a structure of the structure points, vegetation points, and structure points;
    determining adjacent points based on the corners, wherein the adjacent points have the same orientation or tilt;
    determining the viable area based on the adjacent points; and
    determining solar power configuration based on the viable area.

14. A computer program product for determining a viable area for solar radiation, the computer program product being embodied in a non-transitory computer readable storage medium and comprising computer instructions for:
  receiving location information;
  determining, using a processor, imagery data based on the location information;
  determining a point cloud using the imagery data, wherein the determining of the point cloud comprises:
    determining points corresponding with a plurality of images of the imagery data;
    determining coordinates associated with the points; and
    projecting the points onto images of the earth to obtain a set of three dimensionally specified points;
  determining ground points, vegetation points, and structure points using the point cloud, wherein determining the one or more features using the point cloud comprises:
    classifying ground points based on a determination of points in a plane;
    classifying vegetation points based on a signature associated with points in an infrared image; and
    classifying structure points based on a determination of points that are above a ground plane;
  determining a viable area using the ground points, vegetation points, and structure points comprises:
    extracting corners of a structure of the structure points, vegetation points, and structure points;
    determining adjacent points based on the corners, wherein the adjacent points have the same orientation or tilt;

determining the viable area based on the adjacent points; and determine solar power configuration based on the viable area.

\* \* \* \* \*

UNITED STATES PATENT AND TRADEMARK OFFICE
CERTIFICATE OF CORRECTION

PATENT NO. : 10,970,591 B2
APPLICATION NO. : 16/442280
DATED : April 6, 2021
INVENTOR(S) : Vijay Anand Ananthakrishnan, Stacia Renee Okura and Mark Andrew Bronez Page 1 of 1

It is certified that error appears in the above-identified patent and that said Letters Patent is hereby corrected as shown below:

In the Claims

In Column 16, Line(s) 23, Claim 13, delete "round" and insert --ground--, therefor.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*